United States Patent
Tseng

(10) Patent No.: US 10,042,522 B2
(45) Date of Patent: *Aug. 7, 2018

(54) PINCH GESTURE TO NAVIGATE APPLICATION LAYERS

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 14/481,033

(22) Filed: Sep. 9, 2014

(65) Prior Publication Data
US 2014/0380236 A1  Dec. 25, 2014

Related U.S. Application Data

(63) Continuation of application No. 12/901,714, filed on Oct. 11, 2010, now Pat. No. 8,856,688.

(51) Int. Cl.
*G06F 3/048* (2013.01)
*G06F 3/0488* (2013.01)
*G06F 3/0481* (2013.01)
*G06F 3/0484* (2013.01)

(52) U.S. Cl.
CPC ........ *G06F 3/0484* (2013.01); *G06F 3/04812* (2013.01); *G06F 3/04883* (2013.01); *G06F 2203/04806* (2013.01)

(58) Field of Classification Search
CPC ..... G06F 3/0484; G06F 3/0488; G06F 3/0481
USPC .................................................. 715/800, 854
See application file for complete search history.

(56) References Cited

U.S. PATENT DOCUMENTS

| | | | |
|---|---|---|---|
| 2003/0160832 A1* | 8/2003 | Ridgley ............ | G06F 17/30994 715/854 |
| 2010/0306696 A1* | 12/2010 | Groth .................... | G06F 3/0481 715/800 |
| 2011/0316884 A1* | 12/2011 | Giambalvo ....... | G06F 17/30058 345/660 |
| 2012/0081375 A1* | 4/2012 | Robert ............. | G06F 17/30126 345/522 |

* cited by examiner

*Primary Examiner* — Tadeese Hailu
*Assistant Examiner* — Darrin Hope
(74) *Attorney, Agent, or Firm* — Baker Botts L.L.P.

(57) ABSTRACT

Using pinch gestures to navigate user interface layers of an application. In particular embodiments, a pinch gesture may cause an application program to close a currently running user interface layer of the application and navigate to another user-interface layer of the application. In some implementations, a pinch gesture may cause an application to close.

20 Claims, 6 Drawing Sheets

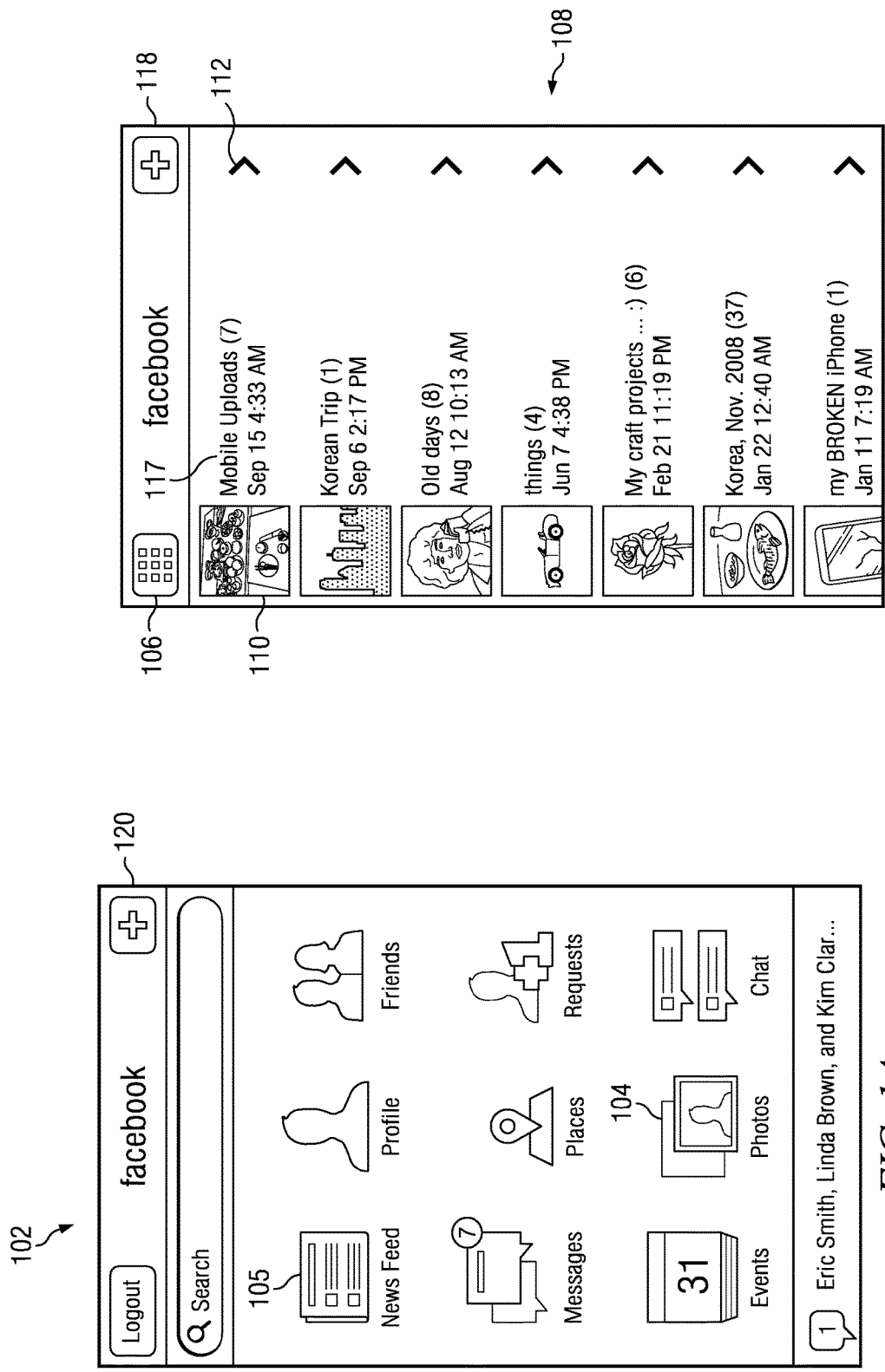

PINCH GESTURE TO NAVIGATE APPLICATION LAYERS

PRIORITY

This application is a continuation under 35 U.S.C. § 120 of U.S. patent application Ser. No. 12/901,714, filed 11 Oct. 2010.

TECHNICAL FIELD

The present disclosure generally relates to touch-based user interfaces, such as touch screen displays and track pads, and gesture-based navigation and handling of applications on a computing device.

BACKGROUND

A touch screen is an electronic visual display device that detects the presence and location of user touch inputs. Similarly, a touchpad is an input device including a surface that detects a touch-based inputs of users. So-called dual touch or multi-touch displays or track pads refer to devices that can identify the presence, location and movement of more than one touch input, such as two or three finger touches. More recently, multi touch user interfaces have become widely adopted with a diverse array of functions responding to touch gestures.

Gesture recognition in connection with single, dual or multi-touch devices refers to the interpretation of touch inputs, such as position and movement, into gestures. A recognized gesture may cause an in-focus application to perform one or more operations, such as scrolling, rotating, zooming, or selecting an object. Dual and multi-touch devices with the ability to recognize two or more touch positions allow for recognition of an increasing number of more complex gestures.

SUMMARY

The present invention provides methods, apparatuses and systems directed to using pinch gestures to navigate user interface layers of an application. In particular embodiments, a pinch gesture may cause an application program to close a currently running user interface layer of the application, or return to a previously viewed user interface layer. In some implementations, a pinch gesture may cause an application to close. These and other features, aspects, and advantages of the disclosure are described in more detail below in the detailed description and in conjunction with the following figures.

BRIEF DESCRIPTION OF THE DRAWINGS

FIGS. 1A-E show example application user interface layers for an application hosted by a multi touch device.

DESCRIPTION OF EXAMPLE EMBODIMENTS

Figure 1C:
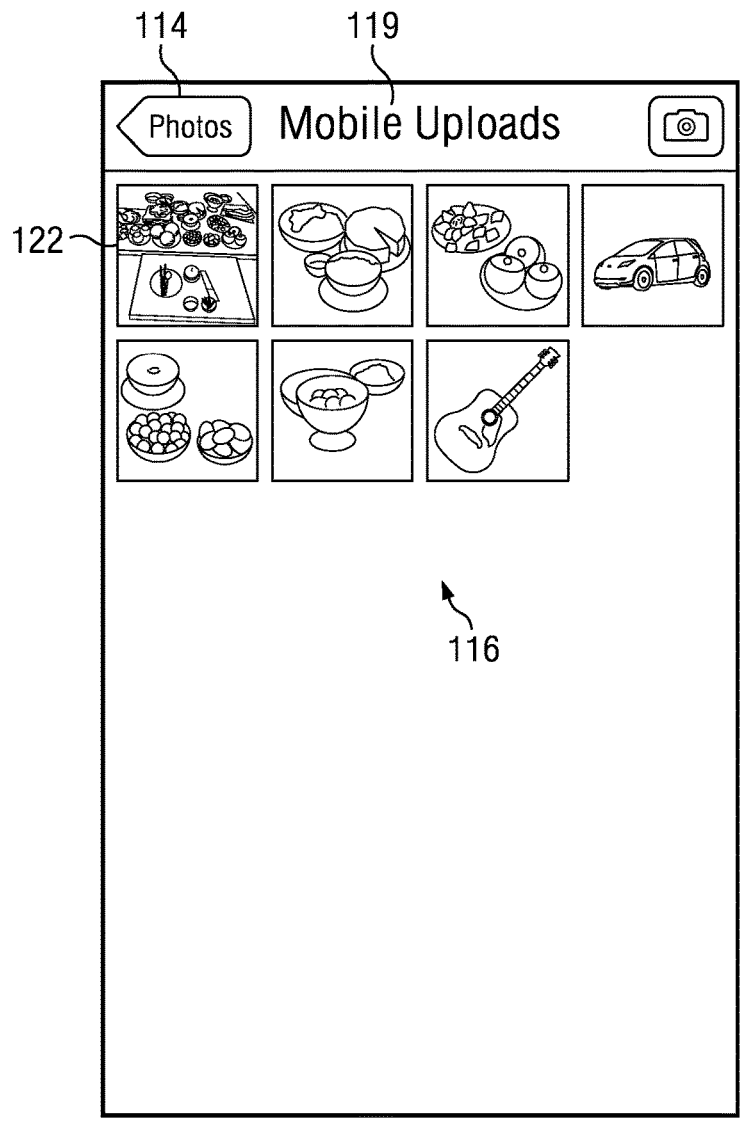

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

User interface layers of application programs are generally arranged in a hierarchy, such as a hierarchical tree structure. A root node of the tree structure may correspond to a home user interface layer or start screen of an application, including icons, buttons, pull-down menus, hypertext links or other controls that allow users to navigate to child user interface layers. Child user interface layers may include icons or buttons that allow users to navigate back to parent user interface layers by touching an icon or button. Many such buttons are displayed on the top of a menu bar, but there are a lot of exceptions.

Touchpads and touchscreens are pointing devices including a specialized surface that can translate the motion and position of user touches to a relative position on screen. Multipoint sensing devices, including touchpads and touchscreens, can distinguish more than one object (finger) simultaneously or near simultaneously. In most cases, multipoint sensing devices, and systems that utilize such devices, monitor a surface for a touch or near touch event. When such an event occurs, they can determine the distinct area(s) of contact and identify the nature of the events via their geometric features and geometric arrangement. Once identified, the touch or near touch events are monitored to determine if they correspond to various gestures events.

A gesture event may be defined as a stylized interaction with the sensing surface mapped to one or more specific computing operations. Gesture events may be made through various hand, and more particularly digit, motions, taps, pressures, dwells, and/or the like. Because the surface is based on multipoint technology, complex gesturing may be performed with any number of digits or other contact portions of the hand. A gesture language (or map) may include for example a set of instructions that recognizes the occurrence of gesture events (e.g., motions), and informs one or more software agents of the gesture events and/or what action(s) to take in response to the gesture events.

Multitouch devices can be embodied in various forms including but not limited to standard-sized touch pads, large extended palm pads, touch screens, touch sensitive housings, etc. Furthermore, multipoint sensing devices can be configured for many form factors including but not limited to tablet computers, netbooks, laptop computers, desktop computers as well as handheld computing devices such as media players, PDAs, cell phones, smartphones, and the like. The multipoint sensing devices may also be found on dedicated input devices such as touch screen monitors, keyboards, navigation pads, tablets, mice, and the like.

Generally, multitouch devices include software, hardware and/or firmware that can recognize certain touch inputs and generate events. These events are processed by handler functions that register or subscribe as listeners to such events. Gesture libraries refer to code libraries that can interpret the touch events to recognize gestures, such as taps, scrolls, swipes, drags and pinch zoom. A pinch zoom event is generally recognized when a user places two fingers on a touchpad and then moves the fingers apart (out-pinch) or together (in-pinch). Generally, a handler function can listen for in-pinch or out-pinch events and respond by scaling (zooming a displayed object) based on the distance and movements of the two fingers. Each time the "scale" gesture is detected on an image, and therefore on the "container" object, a gesture scale event is fired. This is detected by the gesture listener placed on the container object, which calls a gesture scaled handler function. Each time this occurs a value for the change in scale is taken from the event and used to incrementally change the scale value of the target (in this case the "container").

FIG. 1A to 1E are examples of user interface layers of an application hosted on a device with multitouch capabilities. The particular application shown is the Facebook® client hosted by an iPhone® smartphone offered by Apple, Inc. of Cupertino, Calif.; however, implementations of the invention can operate in connection with a wide variety of applications and hosting platforms. Upon launch, the application shows a home or root user interface layer 102, as shown in FIG. 1A. In some applications, if there are more than one view or a layer, the root or home layer may include icons or buttons to navigate to such layers. For example, FIG. 1A illustrates a home layer or root layer 102 of an application hosted on a mobile device having a touch-sensitive display and multitouch capabilities. The root layer 102 includes a set of icons, such as Photos icon 104 or News Feed icon 105.

Figure 1E:
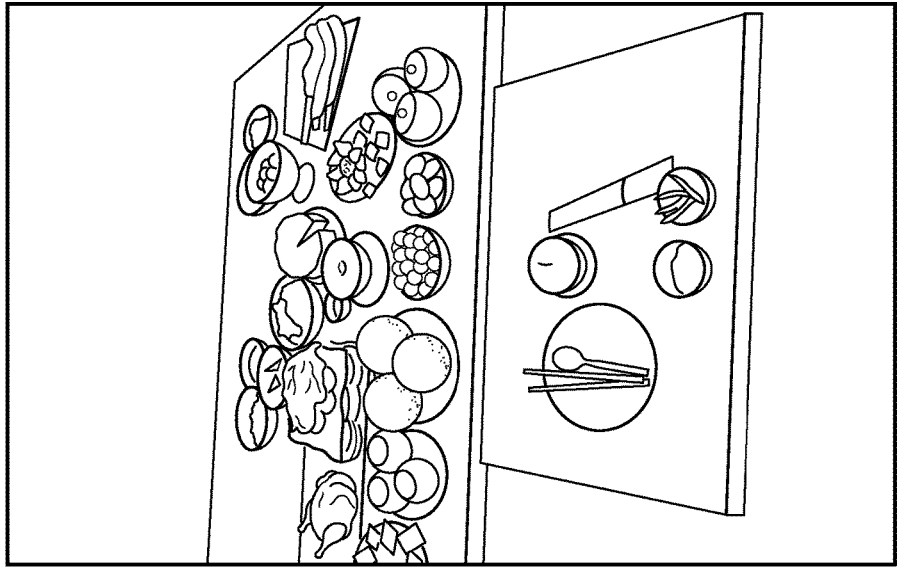
Figure 1D:
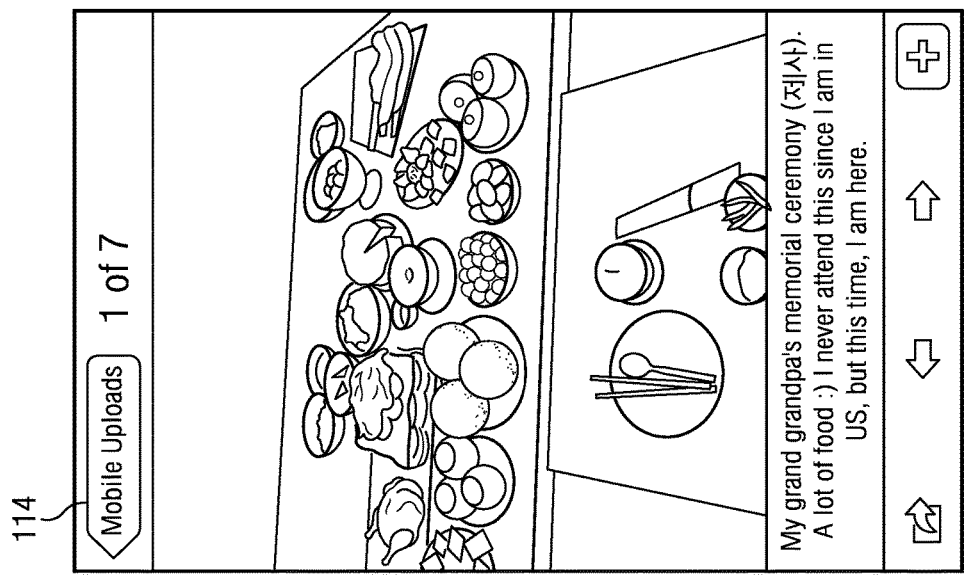
Figure 2:
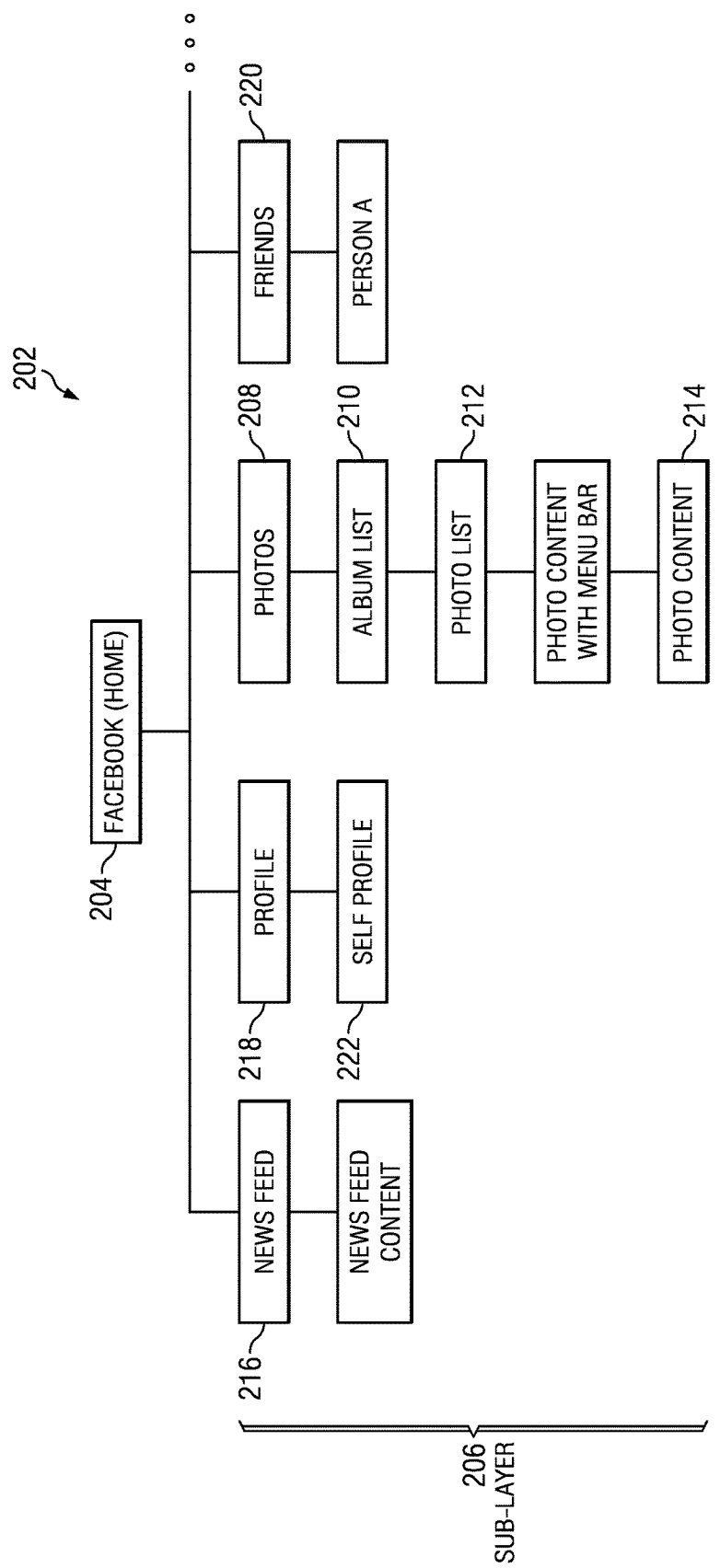
FIG. 2 illustrates an example partial hierarchy of application user interface layers for an application.

FIG. 2 shows a partial application user interface hierarchy 202 implemented by the application illustrated in FIG. 1A to 1E. In particular, the nodes of the hierarchy represent different user interface layers provided by the application, while the edges between the nodes illustrate a potential navigation flow. However, one skilled in the art will recognize that an application may allow for navigation among the nodes in a way that does not observe a hierarchical model, such as navigating directly between sibling node layers, traversing more than one hop directly between layers, and the like. As FIG. 2 shows, the user interface hierarchy includes home layer 204 and one or more sublayers 206, such as "News Feed" 216, "Profile" 218, "Photos" 208, "Friends" 220, and the like. In addition, Photos layer 208 itself has a sublayer of Album List 210 which in turn has Photo list 212, and so on. Not all layers have sublayers, such as layer 214. In this figure, such as News Feed content 216, Self Profile content 222 and Photo content 214 are leaf layers.

When a user launches the application, the application may present the home user interface layer or root layer 102, as illustrated in FIG. 1A. The user may access user interface elements to navigate to various additional user interface layers supported by the application. For example, to navigate to a sublayer from the home layer 102, a user may touch an icon (such as Photos icon 104) or a button (such as Logout button 116 which is on top of the menu bar 120). If the user touches Photos icon 104, the current screen, which displays the home layer, will change to FIG. 1B. The layer depicted in FIG. 1B includes a list of photo albums 108 and home button 106. The home button 106 is linked to the home layer 102; If a user touches home button 106, the current screen will display the home layer 102. If the user chooses one album by touching a picture 110 or an arrow 112, the screen will convert to the contents of the album 116, as depicted in FIG. 1C, with a title 119 of Picture 110 represents album name 117. As FIG. 1C shows, the resulting layer 116 includes a back button 114 named "Photos" which points to left side. The button name "Photos" is the same as the previous layer's title. A user can use this button to go back to the "Photos" layer, and then the screen will change back to the FIG. 1B. On the other hand, if a user touches one of the pictures shown among the contents 116, such as the picture 122, the screen will display another layer 118, such as that depicted in FIG. 1D. The layer 118 illustrated in FIG. 1D has a similar button 121, called "Mobile Uploads," which when activated leads the user back to the "Mobile Upload" layer. However, if the user touches the middle of the displayed picture, the application hides all menus and displays the final content of this leaf layer, as shown in FIG. 1E, an image 124. Since the content of this leaf layer includes a scalable object (here, an image), the application allows the user to scale the image by zooming in or out by using out-pinch (zoom in) or in-pinch (zoom out).

From the foregoing example, if a user wants to go to a specific sublayer, he may touch an icon or a button that links to the expected sublayer. On the other hand, to go back to the parent layer, he may select back button 114. In addition, to navigate back to the home layer, he may select the home button 106. While the foregoing allows user to navigate within an application, it fails to fully take advantage of multitouch capabilities.

Implementations of the invention allow users to use pinch gestures to navigate between user interface layers of an application. In particular embodiments, a pinch gesture, such as an in-pinch gesture, may cause an application program to close a currently running user interface layer of the application, or return to a previously visited user interface layer. In addition to, or in lieu of, using the home button or back button described above, a user may use in-pinch gestures to navigate to upper layers of the hierarchy, or use out-pinch gestures to navigate back to previous layers without having to identify the position of these interface buttons.

As discussed above, the application may be configured to register a handler function that responds to pinch events. In a particular implementation, the handler function for pinch events can be configured to respond to in-pinch and out-pinch events in a manner that provides for interface navigation functionality, as opposed to scaling or zooming a scalable object such as text, images, or other media objects.

Figure 3:
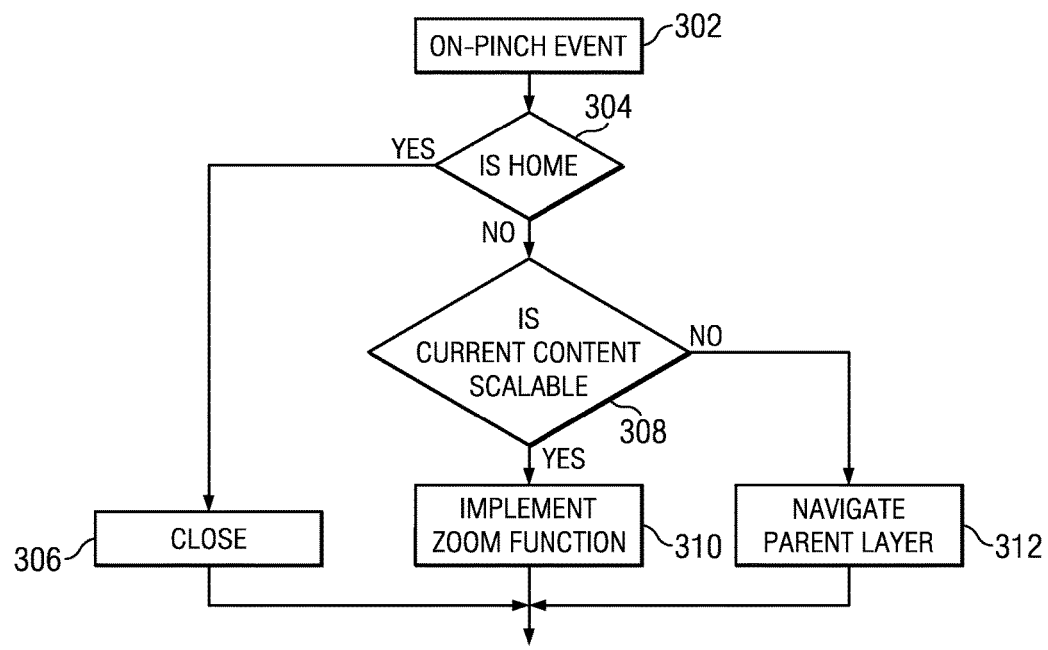
FIG. 3 is a flow chart illustrating an example method directed to processing an in-pinch event.

FIG. 3 illustrates a flow chart illustrating a method for processing in-pinch events. By registering a handler function for pinch events (302), the application process can, responsive to a pinch event, cause navigation to a different user interface layer, or the scaling of an object within the current layer. In particular implementations, to navigate back to the parent layer or to close the application, a user may use in-pinch gestures. When pinch event (302) occurs, the handler function identifies if the current layer is home screen (304). If the current layer is home layer (304), then the handler function causes the operating system of the host to close the application. In such an implementation, the home screen displays a root user interface layer 204. The application interprets an in-pinch gesture as a command to close the application. In an alternative implementation, the pinch gesture could cause the application to have the operating system shift the focus to another application currently running within the context of the operating system. Since the application cannot navigate beyond the root layer 204, the application interprets the pinch gesture as a desire to close the application. If not, if an object within the current user interface layer is scalable (such as text, images, or other media objects) (308), the application may interpret the pinch gesture as a zoom command and scale the object accordingly (310). The handler function may recognize that a zoom function is to be implemented (310) based on object types in the current view, such as images or an HTML page. In some implementations, each user interface layer may include a flag or other indicator as to whether it includes scalable elements or is otherwise to respond to pinch gestures as scaling commands. As discussed above, if scaling is indicated, then the event handler may implement a zoom function (310) by scaling one or more objects rendered in the current user interface layer. instead of directing back to the parent layer (312). If the content is not expandable, the application navigates from the current interface layer to the parent interface layer (312). For example and with reference to FIG. 2, an in-pinch gesture may cause the application to navigate from a newsfeed layer 216 to home layer 204.

Figure 4:
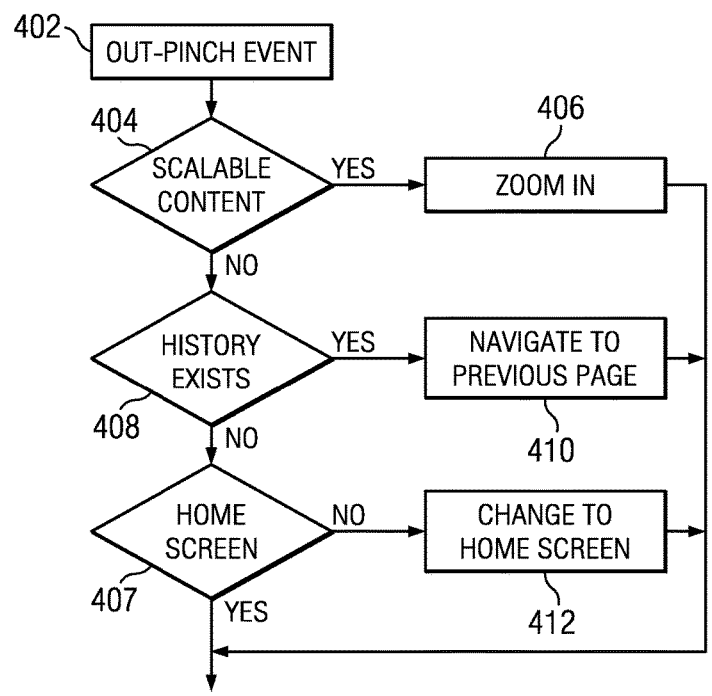
FIG. 4 is a flow chart showing an example method directed to processing an out-pinch event.

Pinch events may also be processed and utilized in other ways. In one implementation, the application may store a navigation history that tracks the layers to which the user navigates. FIG. 4 illustrates a flow chart of a method directed to processing an out-pinch event (402). As described below, an out-pinch gesture may cause the application to implement "go back" functionality. To implement this functionality, the handler function may consider two attributes: for example, whether an object of the current layer has a scalable object (404) and if a view history exists (408). If the current layer includes a scalable object (404), the application may perform a "zoom-in" function in response to the out-pinch gesture (402). Otherwise, there are two options: the application may navigate to the home screen layer (412), or it may navigate back to the previously opened layer (410). If there is a view history (408), the previously navigated layer (410) will replace current layer. This form of navigation represents similar functionality to web browsers. If no navigation history exists, home layer 204 will replace current layer, since it is the root layer of application hierarchy. Also if current layer is the same as the root layer 204 without history (408), current stays the same.

Figure 5:
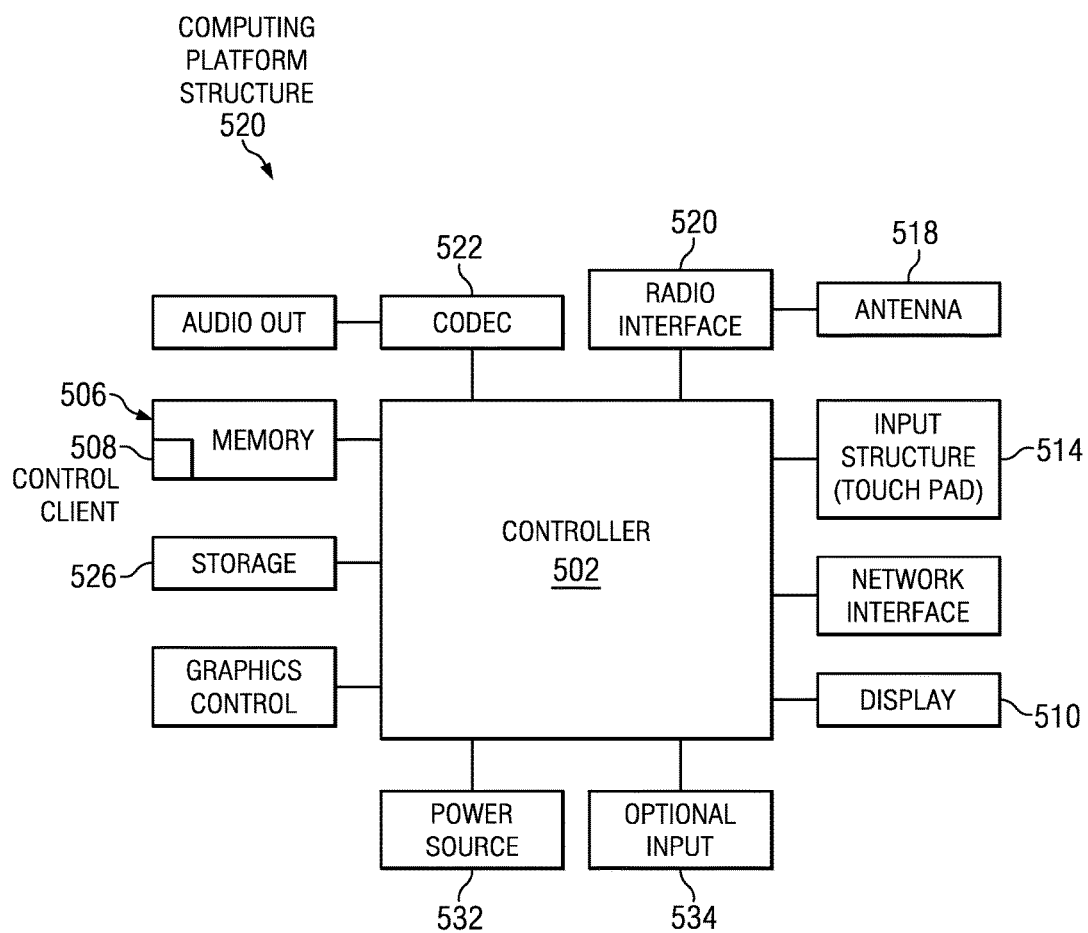
FIG. 5 illustrates an example computer system.

The application and functionality described above can be implemented as a series of instructions stored on a computer-readable storage medium that, when executed, cause a programmable processor to implement the operations described above. While the invention may be implemented in a variety of different hardware and computing systems, FIG. 5 shows a schematic representation of the main components of an example computing platform 502, according to various particular embodiments. Multipoint sensing devices generally include a controller 504 which may comprise a microcontroller or one or more processors configured to execute instructions and to carry out operations associated with a computing platform. In various embodiments, controller 504 may be implemented as a single-chip, multiple chips and/or other electrical components including one or more integrated circuits and printed circuit boards. Controller 504 may optionally contain a cache memory unit for temporary local storage of instructions, data, or computer addresses. By way of example, using instructions retrieved from memory, controller 504 may control the reception and manipulation of input and output data between components of computing platform 502.

Controller 504 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 508 described below) and/or data may be physically stored within a memory block 506 that is operatively coupled to controller 504.

Memory block 506 encompasses one or more storage media and generally provides a place to store computer code (e.g., software and/or firmware) and data that are used by the computing platform 502. By way of example, memory block 506 may include various tangible computer-readable storage media including Read-Only Memory (ROM) and/or Random-Access Memory (RAM). As is well known in the art, ROM acts to transfer data and instructions uni-directionally to controller 504, and RAM is used typically to transfer data and instructions in a bi-directional manner. Memory block 506 may also include one or more fixed storage devices in the form of, by way of example, solid-state hard disk drives (HDDs), among other suitable forms of memory coupled bi-directionally to controller 504. Information may also reside on a removable storage medium loaded into or installed in multipoint sensing devices when needed. By way of example, any of a number of suitable memory cards may be loaded into computing platform 502 on a temporary or permanent basis.

Controller 504 is also generally coupled to a variety of interfaces such as graphics control, video interface, input interface, output interface, and storage interface, and network interface, and these interfaces in turn are coupled to the appropriate devices. In certain embodiment, Controller 504 may connected to an input structure 514 and display 516 may be provided together, such an in the case of a touch-screen where a touch sensitive mechanism is provided in conjunction with the display 516. In such embodiments, the user may select or interact with displayed interface elements via the touch sensitive mechanism. In this way, the displayed interface may provide interactive functionality, allowing a user to navigate the displayed interface by touching the display 516.

Electric signals (e.g., analog) may be produced by microphone 510 and fed to earpiece 512. Controller 504 may receive instruction signals from input structure 514 and control the operation of display 516. By way of example, display 516 may incorporate liquid crystal display (LCD), light emitting diode (LED), Interferometric modulator display (IMOD), or any other suitable display technology. Audio signals may be transmitted and received by means of an antenna 518 that may be connected through a radio interface 520 or audio input interface such as microphone 524 to codec 522 configured to process signals under control of controller 504. Additionally, multipoint sensing devices may be powered power source 532.

Mobile device 104 may also include one or more user input devices 534 (other than input structure 514) that are operatively coupled to the controller 504. Generally, input devices 534 are configured to transfer data, commands and responses from the outside world into multipoint sensing devices. By way of example, mobile device may include a keyboard or mouse. Input devices 534 may also include one or more hard buttons.

Display device 516 is generally configured to display a graphical user interface (GUI) that provides an easy to use visual interface between a user of the computing platform 502 and the operating system or application(s) running on the mobile device. Generally, the GUI presents programs, files and operational options with graphical images. During operation, the user may select and activate various graphical images displayed on the display 516 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of controller 504 (such as, for example, one or more internal registers or caches), one or more portions of memory 506, one or more portions of storage 526, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. For example, while the implementations described above operates with touchscreens, other implementations of the invention can be implemented on touchpad devices having a display separate from a touch sensing surface. Furthermore, the relation between in-pinch and out-pinch gestures to the navigation function described above can be reversed, such that out-pinch events cause application to close, as opposed to in-pinch events. In other implementations, out-pinch and in-pinch events can be treated as the same type of command for purposes of navigating a user interface hierarchy. Similarly, where appropriate, the appended claims encompass all changes, substitutions, variations, alterations, and modifications to the example embodiments herein that a person having ordinary skill in the art would comprehend.

What is claimed is:

1. A method comprising:
   by a computing device, receiving user input comprising a two-dimensional pinch event on a user interface of an application executing on the computing device, the application comprising one or more user-interface layers in a navigation hierarchy;
   by a computing device, determining whether an object in the user interface is scalable;
   by a computing device, in response to a determination that the object is scalable, scaling the object based on the pinch event;
   by the computing device, in response to a determination that the object is not scalable:
      by a computing device, determining a user-interface layer of the application corresponding to the pinch event; and
      by a computing device:
         when the user-interface layer of the application corresponding to the pinch event is a root layer of the navigation hierarchy, then terminating presentation of the application on the computing device; and
         when the user-interface layer of the application corresponding to the pinch event is not the root layer of the navigation hierarchy, then closing the user-interface layer of the application corresponding to the pinch event and navigating to another user-interface layer of the application.

2. The method of claim 1, wherein navigating to another user-interface layer of the application comprises:
   determining whether a navigation history identifies a previous user-interface layer of the application; and:
      when the navigation history identifies a previous user-interface layer of the application, navigating to the previous user-interface layer of the application identified in the navigation history; or
      when the navigation history does not exist, navigating to the root layer of the navigation hierarchy.

3. The method of claim 1, wherein terminating presentation of the application on the computing device comprises terminating execution of the application on the computing device.

4. The method of claim 1, wherein terminating presentation of the application on the computing device comprises closing the application and leaving one or more components of the application in a random-access memory of the computing device.

5. The method of claim 1, further comprising:
   when the user-interface layer of the application comprises a selected layer type, implementing a zoom-out function in response to the pinch event.

6. The method of claim 1, wherein the pinch event comprises an in-pinch event.

7. The method of claim 1, wherein navigating to another user-interface layer of the application comprises navigating to a sibling user-interface layer of the user interface layer corresponding to the pinch event.

8. One or more computer-readable non-transitory storage media embodying software that is operable when executed to:
receive user input comprising a two-dimensional pinch event on a user interface of an application executing on a computing device, the application comprising one or more user-interface layers in a navigation hierarchy;
determine whether an object in the user interface is scalable;
in response to a determination that the object is scalable, scale the object based on the pinch event;
in response to a determination that the object is not scalable:
determine a user-interface layer of the application corresponding to the pinch event; and
when the user-interface layer of the application corresponding to the pinch event is a root layer of the navigation hierarchy, terminate presentation of the application on the computing device; and
when the user-interface layer of the application corresponding to the pinch event is not the root layer of the navigation hierarchy, close the user-interface layer of the application corresponding to the pinch event and navigate to another user-interface layer of the application.

9. The media of claim 8, wherein the software that is operable when executed to navigate to another user-interface layer of the application comprises software that is operable when executed to:
determine whether a navigation history identifies a previous user-interface layer of the application; and:
when the navigation history identifies a previous user-interface layer of the application, navigate to the previous user-interface layer of the application identified in the navigation history; and
when the navigation history does not exist, navigate to the root layer of the navigation hierarchy.

10. The media of claim 8, wherein the software that is operable when executed to terminate presentation of the application on the computing device comprises software that is operable when executed to terminate execution of the application on the computing device.

11. The media of claim 8, wherein the software that is operable when executed to terminate presentation of the application on the computing device comprises software that is operable when executed to:
close the application; and
leave one or more components of the application in a random-access memory of the computing device.

12. The media of claim 8, wherein the software is further operable when executed to:
when the user-interface layer of the application comprises a selected layer type, implement a zoom-out function in response to the pinch event.

13. The media of claim 8, wherein the pinch event comprises an in-pinch event.

14. The media of claim 8, wherein the software that is operable when executed to navigate to another user-interface layer of the application comprises software that is operable when executed to navigate to a sibling user-interface layer of the user interface layer corresponding to the pinch event.

15. A system comprising: one or more processors; and a memory coupled to the processors comprising instructions executable by the processors, the processors being operable when executing the instructions to:
receive user input comprising a two-dimensional pinch event on a user interface of an application executing on a computing device, the application comprising one or more user-interface layers in a navigation hierarchy;
determine whether an object in the user interface is scalable;
in response to a determination that the object is scalable, scale the object based on the pinch event;
in response to a determination that the object is not scalable:
determine a user-interface layer of the application corresponding to the pinch event; and
when the user-interface layer of the application corresponding to the pinch event is a root layer of the navigation hierarchy, terminate presentation of the application on the computing device; and
when the user-interface layer of the application corresponding to the pinch event is not the root layer of the navigation hierarchy, close the user-interface layer of the application corresponding to the pinch event and navigate to another user-interface layer of the application.

16. The system of claim 15, wherein the processors that are operable when executing the instructions to navigate to another user-interface layer of the application comprise processors that are operable when executing the instructions to:
determine whether a navigation history identifies a previous user-interface layer of the application; and:
when the navigation history identifies a previous user-interface layer of the application, navigate to the previous user-interface layer of the application identified in the navigation history; and
when the navigation history does not exist, navigate to the root layer of the navigation hierarchy.

17. The system of claim 15, wherein the processors that are operable when executing the instructions to terminate presentation of the application on the computing device comprise processors that are operable when executing the instructions to terminate execution of the application on the computing device.

18. The system of claim 15, wherein the processors that are operable when executing the instructions to terminate presentation of the application on the computing device comprise processors that are operable when executing the instructions to:
close the application; and
leave one or more components of the application in a random-access memory of the computing device.

19. The system of claim 15, wherein the processors are further operable when executing the instructions to:
when the user-interface layer of the application comprises a selected layer type, implement a zoom-out function in response to the pinch event.

20. The system of claim 15, wherein the pinch event comprises an in-pinch event.

* * * * *